(12) United States Patent
Mayorga et al.

(10) Patent No.: US 11,792,499 B2
(45) Date of Patent: Oct. 17, 2023

(54) TIME-DELAY TO ENFORCE DATA CAPTURE AND TRANSMISSION COMPLIANCE IN REAL AND NEAR REAL TIME VIDEO

(71) Applicant: Raytheon Company, Waltham, MA (US)

(72) Inventors: Allan Mayorga, Salem, MA (US); John A. Cogliandro, Dedham, MA (US); Matthew J. Tacy, Boston, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/507,073

(22) Filed: Oct. 21, 2021

(65) Prior Publication Data

US 2023/0128616 A1 Apr. 27, 2023

(51) Int. Cl.
*H04N 5/232* (2006.01)
*G06V 20/52* (2022.01)
*G06V 10/764* (2022.01)
*G06T 19/20* (2011.01)
(Continued)

(52) U.S. Cl.
CPC ............ *H04N 23/61* (2023.01); *G06T 19/20* (2013.01); *G06V 10/764* (2022.01); *G06V 20/52* (2022.01); *H04N 23/695* (2023.01)

(58) Field of Classification Search
None
See application file for complete search history.

(56) References Cited

U.S. PATENT DOCUMENTS

| 4,992,883 A | * | 2/1991 | Tsunekawa | .......... H04N 1/2112 348/E5.037 |
| 5,594,469 A | | 1/1997 | Freeman et al. | |
| 6,356,437 B1 | | 3/2002 | Mitchell et al. | |

(Continued)

FOREIGN PATENT DOCUMENTS

| CN | 106228544 A | 12/2016 |
| JP | 2000092473 A | 3/2000 |

(Continued)

OTHER PUBLICATIONS

"European Appication Serial No. 18789290.6, Communication Pursuant to Article 94(3) EPC dated Jan. 20, 2021", 7 pgs.

(Continued)

*Primary Examiner* — Stefan Gadomski
(74) *Attorney, Agent, or Firm* — Schwegman Lundberg & Woessner, P.A.

(57) ABSTRACT

To prevent the capture and transmission of excluded data, a short time-delay between an object recognition sensor and the video camera is exploited to recognize disallowed objects and control the video camera to interrupt and stop images from being transferred into the memory chip where the video signal is formed. The time-delay can also be used to enforce an alignment condition of the video camera to an allowed object. The time-delay can be implemented in real or near real time with a delay line or temporary memory chip positioned between the video camera's ROIC and memory chip. The time-delay prevents the excluded data from entering the video signal and reaching circuitry or being processed downstream of the memory chip.

20 Claims, 8 Drawing Sheets

(51) Int. Cl.
  *H04N 23/61* (2023.01)
  *H04N 23/695* (2023.01)

(56) References Cited

U.S. PATENT DOCUMENTS

| | | |
|---|---|---|
| 6,970,183 B1 | 11/2005 | Monroe |
| 7,110,909 B2 | 9/2006 | Friedrich et al. |
| 7,126,558 B1 | 10/2006 | Dempski |
| 7,372,451 B2 | 5/2008 | Dempski |
| 7,596,240 B2 | 9/2009 | Ito et al. |
| 7,653,259 B2 | 1/2010 | Pilu |
| 8,432,559 B2* | 4/2013 | Kobayashi ......... H04N 1/00875 358/1.14 |
| 8,749,343 B2 | 6/2014 | Cirker |
| 9,179,105 B1* | 11/2015 | Zeira ..................... H04N 7/183 |
| 9,313,391 B1 | 4/2016 | Zhang et al. |
| 9,582,709 B2 | 2/2017 | Wang et al. |
| 10,089,790 B2 | 10/2018 | Lawson et al. |
| 10,122,825 B1* | 11/2018 | Petty ..................... H04L 63/08 |
| 10,142,410 B2 | 11/2018 | Giffin et al. |
| 10,403,046 B2 | 9/2019 | Pinti et al. |
| 10,425,403 B2 | 9/2019 | Chen et al. |
| 10,440,348 B2 | 10/2019 | Koppal et al. |
| 10,531,137 B1 | 1/2020 | Matak et al. |
| 10,602,054 B2 | 3/2020 | Jung et al. |
| 10,674,972 B1* | 6/2020 | Piatrou ................. A61B 6/4208 |
| 10,679,425 B2 | 6/2020 | Pinti et al. |
| 10,878,584 B2 | 12/2020 | Agata et al. |
| 2004/0233282 A1* | 11/2004 | Stavely ............ G08B 13/19602 348/154 |
| 2005/0018879 A1 | 1/2005 | Ito et al. |
| 2008/0030575 A1 | 2/2008 | Davies et al. |
| 2010/0002071 A1 | 1/2010 | Ahiska |
| 2011/0130949 A1 | 6/2011 | Arrasvuori |
| 2011/0142369 A1 | 6/2011 | Aila et al. |
| 2012/0074296 A1* | 3/2012 | Hammes ............... G06V 10/141 250/205 |
| 2012/0087546 A1 | 4/2012 | Focke et al. |
| 2012/0203487 A1 | 8/2012 | Johnson et al. |
| 2013/0278778 A1* | 10/2013 | Kagei ................. H04N 5/23299 348/169 |
| 2014/0168084 A1 | 6/2014 | Burr |
| 2014/0210856 A1 | 7/2014 | Finn et al. |
| 2015/0186728 A1 | 7/2015 | Kimura |
| 2015/0302647 A1 | 10/2015 | Osterhout et al. |
| 2016/0026253 A1 | 1/2016 | Bradski et al. |
| 2016/0080642 A1* | 3/2016 | Jung |
| 2016/0080652 A1* | 3/2016 | Shirota ............ H04N 5/232411 348/222.1 |
| 2016/0133054 A1* | 5/2016 | Honjo ..................... G06V 20/20 345/633 |
| 2016/0273908 A1 | 9/2016 | Rose et al. |
| 2016/0335524 A1* | 11/2016 | Bremer ................. G06K 9/6215 |
| 2016/0349228 A1 | 12/2016 | Kester et al. |
| 2016/0378939 A1 | 12/2016 | Baumberger et al. |
| 2017/0193279 A1* | 7/2017 | Kusens ................. G06V 10/44 |
| 2017/0213079 A1 | 7/2017 | Herger et al. |
| 2017/0273549 A1 | 9/2017 | Nazareth et al. |
| 2017/0323062 A1 | 11/2017 | Djajadiningrat et al. |
| 2017/0339295 A1* | 11/2017 | Honda ................. H04N 1/2376 |
| 2018/0092698 A1 | 4/2018 | Chopra et al. |
| 2018/0259673 A1* | 9/2018 | Cui ......................... G01N 23/12 |
| 2018/0309808 A1* | 10/2018 | Andon ................. H04L 65/403 |
| 2018/0330096 A1* | 11/2018 | Breindel ............... A63F 13/358 |
| 2018/0330110 A1* | 11/2018 | Nelson ................. G06F 21/60 |
| 2018/0336737 A1 | 11/2018 | Varady et al. |
| 2018/0341812 A1* | 11/2018 | Floor ..................... G06V 20/42 |
| 2019/0066403 A1* | 2/2019 | Nagura ................. G07C 5/085 |
| 2019/0088026 A1 | 3/2019 | Isaacson et al. |
| 2019/0122378 A1 | 4/2019 | Aswin |
| 2019/0122437 A1 | 4/2019 | Pinti et al. |
| 2019/0188930 A1* | 6/2019 | Tsukahara ............ G07C 5/008 |
| 2019/0335115 A1* | 10/2019 | Kumai ................... G06F 3/013 |
| 2020/0082631 A1 | 3/2020 | Yoon et al. |
| 2020/0143643 A1* | 5/2020 | Kusens ............... G08B 21/0476 |
| 2020/0174261 A1* | 6/2020 | Uenohara ............. G02B 27/01 |
| 2020/0210726 A1 | 7/2020 | Yang et al. |
| 2020/0334919 A1* | 10/2020 | Bowen ..................... G06F 30/20 |
| 2020/0394430 A1* | 12/2020 | Ahmed ................. G06V 10/776 |
| 2021/0070311 A1 | 3/2021 | Patychuk et al. |
| 2021/0224885 A1* | 7/2021 | Yarra .................. G06Q 30/0643 |
| 2023/0131642 A1 | 4/2023 | Tacy et al. |

FOREIGN PATENT DOCUMENTS

| | | |
|---|---|---|
| JP | 2000228741 A | 8/2000 |
| JP | 2006025250 A | 1/2006 |
| JP | 2006293605 A | 10/2006 |
| JP | 2011097238 A | 5/2011 |
| JP | 2015126352 A | 7/2015 |
| JP | 2016167688 A | 9/2016 |
| JP | 2017108263 A | 6/2017 |
| JP | 2017529635 A | 10/2017 |
| JP | 2021118499 A | 8/2021 |
| JP | 7258084 B2 | 4/2023 |
| WO | WO-2010094065 A1 | 8/2010 |
| WO | WO-2015170409 A1 | 11/2015 |
| WO | WO-2017027338 A1 | 2/2017 |
| WO | WO-2017177019 A1 | 10/2017 |
| WO | WO-2017204081 A1 | 11/2017 |
| WO | WO-2023069511 | 4/2023 |
| WO | WO-2023069527 | 4/2023 |

OTHER PUBLICATIONS

"European Application Serial No. 18789290.6, Respoonse filed May 7, 2021 to Communication Pursuant to Article 94(3) EPC dated Jan. 20, 2021", 21 pgs.

"XMReality 4.4 Manual, XMReality Remote Guidance, "Like Being There" XMReality AB, 2015.", (2015), 49 pages.

Henderson, Steven, et al., "Augmented Reality for Maintenance and Repair (ARMAR)", Air Force Research Laboratory Human Effectiveness Directorate Warfighter Readiness Research Division Logistics Readiness Branch Wright-Patterson AFB OH 45433-7604, (Aug. 2007), 70 pages.

Henderson, Steven, et al., "Evaluating the Benefits of Augmented Reality for Task-Localization in Maintenance of an Armored Personnel Carrier Turret", IEEE International Symposium on Mixed and Augmented Reality 2009 Science and Technology Proceedings, (Oct. 19-22, 2009), 10 pages.

Molineros, Jose, et al., "Computer vision for guiding manual assembly", Proceedings of the 2001 IEEE International Symposium on Assembly and Task Planning, (May 29-29, 2001), 7 pages.

Reiners,, Dirk, et al., "Augmented Reality for Construction Tasks: Doorlock Assembly", http://www.igd.fhg.de/www/igd-a4/, (Nov. 1998), 10 pages.

Smith, Randall, et al., "Estimating Uncertain Spatial Relationships in Robotics", Machine Intelligence and Pattern Recognition 1, (Jan. 1986), 435-461.

Tang, Arthur, et al., "Comparative Effectiveness of Augmented Reality in Object Assembly", Paper: New Techniques for Presenting Instructions and Transcripts CHI 2003: New Horizons, (Apr. 5-10, 2003), 8 pages.

U.S. Appl. No. 15/907,853 U.S. Pat. No. 10,403,046, filed Feb. 28, 2018, Field of View (FOV) and Key Code Limited Augmented Reality (AR) to Enforce Data Capturie of Transmission Compliance.

U.S. Appl. No. 16/416,939 U.S. Pat. No. 10,679,425, filed May 20, 2019, Field of View (FOV) and Key Code Limited Augmented Reality (AR) to Enforce Data Capturie and Transmission Compliance.

U.S. Appl. No. 17/507,111, filed Oct. 21, 2021, Predictive Field-of-View (FOV) and Cueing to Enforce Data Capture and Transmission Compliance in Real and Near Real Time Video.

"Canadian Application Serial No. 3076505, Voluntary Amendment filed Apr. 28, 2020", 11 pgs.

"European Application Serial No. 21188467.1, Extended European Search Report dated Nov. 2, 2021", 9 pgs.

(56) References Cited

OTHER PUBLICATIONS

"European Application Serial No. 21188467.1, Response filed Jan. 7, 2022 to Extended European Search Report dated Nov. 2, 2021", 16 pgs.

"International Application Serial No. PCT/US2018/052626, Written Opinion dated Dec. 7, 2018", 9 pgs.

"International Application Serial No. PCT/US2018/052626, International Preliminary Report on Patentability dated Apr. 21, 2020", 10 pgs.

"International Application Serial No. PCT/US2018/052626, international Search Report dated Dec. 7, 2018", 4 pgs.

"Korean Application Serial No. 10-2020-7007808, Notice of Preliminary Rejection dated Nov. 30, 2021", w/ English translation, 5 pgs.

"Korean Application Serial No. 10-2020-7007808, Response filed Jan. 25, 2022 to Notice of Preliminary Rejection dated Nov. 30, 2021", with machine translation, 24 pgs.

"Korean Application Serial No. 10-2020-7007808, Voluntary Amendment filed May 21, 2020", with English translation of claims, 29 pgs.

"Japanese Application Serial No. 2021-112687, Notification of Reasons for Refusal dated Aug. 2, 2022", w/ English Translation, 6 pgs.

"U.S. Appl. No. 17/507,111, Non Final Office Action dated Nov. 25, 2022", 20 pgs.

"U.S. Appl. No. 17/507,111, Response filed Jan. 23, 2023 to Non Final Office Action dated Nov. 25, 2022", 16 pgs.

"Canadian Application Serial No. 3076505, Office Action dated Dec. 16, 2022", 5 pgs.

"Canadian Application Serial No. 3076505, Response filed Dec. 20, 2022 to Office Action dated Dec. 16, 2022", 7 pgs.

"Canadian Application Serial No. 3076505, Voluntary Amendment filed Dec. 21, 2022", 12 pgs.

"International Application Serial No. PCT/US2022/047126, Invitation to Pay Additional Fees dated Feb. 1, 2023", 12 pgs.

"International Application Serial No. PCT/US2022/047144, Invitation to Pay Additional Fees dated Jan. 31, 2023", 15 pgs.

"Japanese Application Serial No. 2021-112687, Response filed Oct. 31, 2022 to Notification of Reasons for Refusal dated Aug. 2, 2022", with English translation of claims, 10 pgs.

"Kuwait Application Serial No. KW/P/2020/138, Office Action dated Dec. 27, 2022", 5 pgs.

Vollmer, Michael, et al., "High speed and slow motion: the technology of modern high speed cameras", Physics Education, Institute of Physics Publishing, Bristol, GB, vol. 46, No. 2, (Mar. 3, 2011), 191-202.

"U.S. Appl. No. 17/507,111, Notice of Allowance dated Apr. 7, 2023", 8 pgs.

"U.S. Appl. No. 17/733,456, Ex Parte Quayle Action dated Apr. 7, 2023", 9 pgs.

"U.S. Appl. No. 17/733,456, Response filed Apr. 21, 2023 to Ex Parte Quayle Action dated Apr. 7, 2023", 10 pgs.

"International Application Serial No. PCT/US2022/047126, International Search Report dated Mar. 24, 2023", 6 pgs.

"International Application Serial No. PCT/US2022/047126, Written Opinion dated Mar. 24, 2023", 10 pgs.

"International Application Serial No. PCT/US2022/047144, International Search Report dated Mar. 23, 2023", 6 pgs.

"International Application Serial No. PCT/US2022/047144, Written Opinion dated Mar. 23, 2023", 13 pgs.

"Kuwaiti Application Serial No. KW/P/2020/138, Response filed Feb. 9, 2023 to Office Action dated Dec. 27, 2022", W/ English Claims, 4 pgs.

"Saudi Arabian Application Serial No. 520411721, Office Action dated Mar. 28, 2023". W/English Translation, 11 pgs.

"Taiwanese Application Serial No. 111136376, Office Action dated Apr. 26, 2023", with machine translation, 21 pgs.

\* cited by examiner

TIME-DELAY TO ENFORCE DATA CAPTURE AND TRANSMISSION COMPLIANCE IN REAL AND NEAR REAL TIME VIDEO

BACKGROUND OF THE INVENTION

Field of the Invention

This invention relates to the capture and processing of video to enforce data capture and transmission compliance in real or near real-time private, restrictive or secure environments.

Description of the Related Art

Video camera technology is increasingly ubiquitous in the world today. Devices such as head-mounted cameras, robotically controlled cameras, semi-autonomous or autonomous robots, cellular telephones, desktop or table computers, near-eye displays and hand-held game systems, for example, may include cameras and associated software to enable video capture, display and transmission. These devices are being used to provide unidirectional or bi-directional video communication in real or near real time. Privacy and security concerns exists when, intentionally or unintentionally, video that should not be captured, stored, displayed or transmitted is. A person's, company's or country's privacy may be violated, possibly illegally. In certain restrictive, such as military or company proprietary or secure environments, strict controls exist governing what visual information may be captured, stored, displayed or transmitted.

In an effort to restrict unwanted video capture or transmission, some existing systems monitor the video as it is captured. These systems use human processing, artificial intelligence (AI), computational algorithms, or a combination thereof to identify problematic visual information (e.g. a person's face or a company's proprietary information) and then either removes or obscures the information from the video file data. These systems may even shut off the recording device to prevent further capture of problematic information. However, the existing systems described all capture, store, and process the problematic information. Because the problematic data is stored (albeit sometimes only temporarily) and processed, data spill risks still exist, and therefore these systems cannot meet requirements for certain secure or restrictive environments. The processing required to remove or obscure the information from the video file makes these systems incompatible with applications that require real or near real time video capture and transmission.

Video capture that enforces data capture and transmission compliance in real or near real-time may be needed in a variety of applications for individual users, companies or countries. Such applications may include but are not limited to inspection/process review, supplier quality management, internal audits, troubleshooting of equipment or systems, factory operations, factory collaboration, validation and verification, repair and upgrades of equipment, training on equipment or systems. In these applications, it may be necessary to capture and uni-directionally or bi-directionally transmit video of a local scene that includes problematic information or real or near real time to facilitate efficient and effective communication. As a special case, data capture and transmission compliance may be implemented in an Augmented Reality environment.

Augmented Reality (AR) refers to the generation of two or three dimensional (3D) video graphics or other media such that they are overlaid on and registered with surrounding objects in the environment. Man-made "markers" aka "sources" having a unique and easily identifiable signature may be placed on the user, on the object or in the scene and used for various purposes. These markers have been used to identify and locate specific objects, to trigger the display of computer generated media or to determine the position and pose of the user.

In certain video or AR environments such as a remote repair or inspection, a concern, primarily of the customer and which is heightened by the video camera industry push to maximize the FOV, is that the user of the video being captured and transmitted or viewed locally (either the field technician or expert, but primarily the field technician), may turn away from the object of interest, intentionally or unintentionally, and capture video of another portion of the scene that should not be captured or transmitted. Some level of data capture and transmission compliance may be required by customer demands, industry regulations, national security or country specific laws to avoid unintentional or intentional broad FOV transmission. Current techniques include physically draping with a cloth or tarp the areas around the object of interest to prevent capture in the video signal, mechanically narrowing the FOV, or sequestering the video prior to transmission and having a security-cleared domain expert review and edit the video signal post-capture. These are time consuming activities. Even more common, and more costly is the removal of the equipment in question to a specialized secure space, such as an empty garage or hanger so that there are no extraneous items in the scene. In many cases removing equipment, physical draping or post-capture editing are either not sufficient to satisfy the compliance requirements or are impractical and costly to implement in a quasi real-time interactive situation. In some situations there are country laws that would prevent any type of post-capture editing for national security and ITAR—International Traffic and Arms Regulations reasons.

U.S. Pat. Nos. 10,403,046 and 10,679,425 entitled "Field of View (FOV) and Key Code Limited Augmented Reality to Enforce Data Capture and Transmission Compliance" disclosed enforcement of an alignment condition between the video camera's pointing direction and a marker in the scene to avoid capture of excluded data in a real-time interactive situation. This may be done, for example, by determining whether the video camera pointing direction satisfies an alignment condition to a marker in the local scene such that the video camera FOV lies within a user-defined allowable FOV about the marker. A separate sensor may be used to detect the presence of the marker within a sensor FOV to satisfy the alignment condition. The camera or sensor FOV may be reduced to create a buffer zone to provide additional assurance that the camera FOV does not stray outside the allowable FOV. If the alignment condition is not satisfied, the video camera is controlled to exclude at least a portion of the camera FOV that lies outside a user-defined allowable FOV from capture within the video signal. For example, this could be done by turning the video camera off or by narrowing its FOV. Markers may also be used as a fail safe to ensure imagery in a particularly sensitive area of the scene is neither captured nor transmitted. If the separate sensor detects these markers, the video camera is shut down. The system may cue the user e.g., "green" means the alignment condition is satisfied, "yellow" means the technician's eyes are beginning to wander and "red" means the alignment condition is violated and the camera is disabled. In this system, the use of a separate sensor to enforce the alignment condition and to detect other markers in sensitive areas is specifically designed for more rigorous environments, in which compliance requires that portions of the scene or tagged objects cannot be captured (detected) by the video camera itself, much less output into the video signal and for environments in which real or quasi real-time interaction is required.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a method for time-delayed storage of images that form the video signal to provide for enforcement of data capture and transmission compliance of real and near real time video.

To provide for enforcement of data capture and transmission compliance of real or near real time video, the present invention creates a short time-delay between an object recognition sensor and the video camera to recognize disallowed objects and control the video camera to interrupt and stop images from being transferred into the memory chip where the video signal is formed. The time-delay can also be used to enforce an alignment condition of the video camera to an allowed object. The time-delay can be implemented with a delay line (circuit) or temporary memory chip positioned between the video camera's ROIC and memory chip.

In an embodiment, a video camera is used to capture light within a camera field-of-view (CFOV) in a pointing direction in the local scene. The video camera includes a detector array to sense and integrate light to form an image, a read out integrated circuit (ROIC) to read out a sequence of images at a frame rate and a memory chip to store the sequence of images to form the video signal. Prior to forming the video signal, a sensor (2 or 3D camera, Lidar or Sonar) and an object recognition processor capture a sensed signal within a sensor FOV (SFOV) along the pointing direction that spans the entire CFOV and process the sensed signal to recognize and locate disallowed objects within the SFOV. The video camera captures light within the CFOV while delaying the storage of images in the memory chip by a time-delay with respect to the sensed signal. If a disallowed objected is recognized and prior to expiration of the time-delay, the video camera is controlled to prevent storage of images including the disallowed object in the memory chip and its inclusion in the video signal.

In different embodiments, the video camera includes a delay element positioned between the ROIC and the memory chip (e.g. a delay line or circuit that delays transfer of the images to the memory chip or a temporary memory chip that holds the images for the time-delay before transferring them to the memory chip.) The temporary memory chip does not retain the images and is isolated from any other hardware that could store, display or transmit the images. In response to the recognition of a disallowed object, the delay element is controlled to dump the time-delayed image(s) that include the disallowed object before the image(s) reach the memory chip. In another embodiment, the ROIC has a higher frame rate than the video camera. If a disallowed objected is recognized, the ROIC is disabled prior to reading out the next frame. Or the power to the entire video camera may be interrupted to deactivate or disable the video camera. Or the video camera's pointing direction may be controlled to look away from the disallowed object. As a result, disallowed objects do not make it into the video signal and thus do not reach downstream circuitry, processing or a network to which the video camera is connected.

In an embodiment, the sensor is used to generate a 3D ground truth map of the local scene in which one or more objects are indicated as disallowed and possibly allowed. Any recognized objects are compared against the ground truth map to verify their existence, location and allowed or disallowed designation. The map may be augmented with 2D or 3D models of the allowed or disallowed objects.

In different embodiments, instead of just being based on their content, objects may be defined and disallowed based on other attributes. For example, any object that is identified as having a distance from the video camera that is either too close or too far may be designated as disallowed. The rate of motion (e.g., velocity and acceleration) of an object in the scene may be defined as disallowed if the rate of motion exceeds a maximum value. In addition, the rate of motion of the video camera itself may be defined as a disallowed object if the rate of motion exceeds a maximum value.

In different embodiments, the video camera pointing direction is slaved or controlled by user motion (e.g. a head mounted video camera), a user-controlled manual manipulator (e.g. a robotic arm) or a fully automated manual manipulator (e.g. an AI controlled robotic arm or semi-autonomous or autonomous robot).

In an embodiment, the sensor FOV is greater than the camera FOV creating a buffer zone around the camera FOV in which a disallowed object can be detected prior to entering the camera FOV. If a disallowed object is recognized in the buffer zone, a cue can be generated to change the video camera pointing direction to prevent the disallowed object from entering the camera FOV. For example, an audio or video cue may be presented to the user to turn the user's head away from the disallowed object prior to capturing the disallowed object. Similarly, a cue may be presented to the user of the robotic arm to turn the camera away prior to capturing the disallowed object. In a fully automated system, the cue may override the system and cause the camera to point away.

In different embodiments, the video camera is trained on an allowed object and away from disallowed objects. The sensor and object recognition processor recognize and locate allowed objects. The system determines whether the camera's pointing direction satisfies an alignment condition to one of the allowed objects. If not, the system generates a cue to change the video camera pointing direction to enforce the alignment condition. If the cue fails to enforce the alignment condition, the video camera is deactivated. The ground truth map can be used to verify recognized allowed objects.

These and other features and advantages of the invention will be apparent to those skilled in the art from the following detailed description of preferred embodiments, taken together with the accompanying drawings, in which:

DETAILED DESCRIPTION OF THE INVENTION

Video capture that enforces data capture and transmission compliance in real or near real-time may be needed in a variety of applications for individual users, companies or countries. Such applications may include but are not limited to inspection/process review, supplier quality management, internal audits, troubleshooting of equipment or systems, factory operations, factory collaboration, validation and verification, repair and upgrades of equipment, training on equipment or systems. In these applications, it may be necessary to capture and uni-directionally or bi-directionally transmit video of a local scene that includes problematic information or real or near real time to facilitate efficient and effective communication. As a special case, data capture and transmission compliance may be implemented in an Augmented Reality environment. The video camera pointing direction is slaved or controlled by user motion (e.g. a head mounted video camera or hand-held video camera), a user-controlled manual manipulator (e.g. a robotic arm) or a fully automated manual manipulator (e.g. an AI controlled robotic arm or semi-autonomous or autonomous robot).

The present invention is directed to these and other similar applications in which some level of data capture and transmission compliance may be required by customer demands, industry regulations, national security or country specific laws. In certain instances, compliance may require that portions of a scene or specifically tagged objects cannot be included within the video signal output by the video camera for display or transmission. In other more rigorous environments, compliance may require that portions of the scene or tagged objects cannot be stored in the camera's memory chip, much less output into the video signal. The memory chip may be only a memory chip or may be a video display or video transmission chip that includes memory. The required level of compliance may be determined by a number of different factors and may change between or even during capture and display or transmission of the video signal.

To prevent the capture and transmission of excluded data, a short time-delay between an object recognition sensor and the video camera is exploited to recognize disallowed objects and control the video camera to interrupt and stop images from being transferred into the memory chip where the video signal is formed. The time-delay can also be used to enforce an alignment condition of the video camera to an allowed object. The time-delay can be implemented in real or near real time or slower if the application does not demand such performance with a delay line or temporary memory chip positioned between the video camera's ROIC and memory chip. For example, the slowest acceptable video frame rate for most users is approximately 24 frames/sec (fps), or approximately 42 milliseconds (ms). A time-delay of less than 42 ms would be a generally acceptable to most users. A fast video camera is 120 fps or about 8 ms. At these frame rates a delay of a single frame is certainly real time. The time-delay can be utilized to enforce data capture and transmission compliance for a single image or a sequence of images in the video signal.

Figure 1:
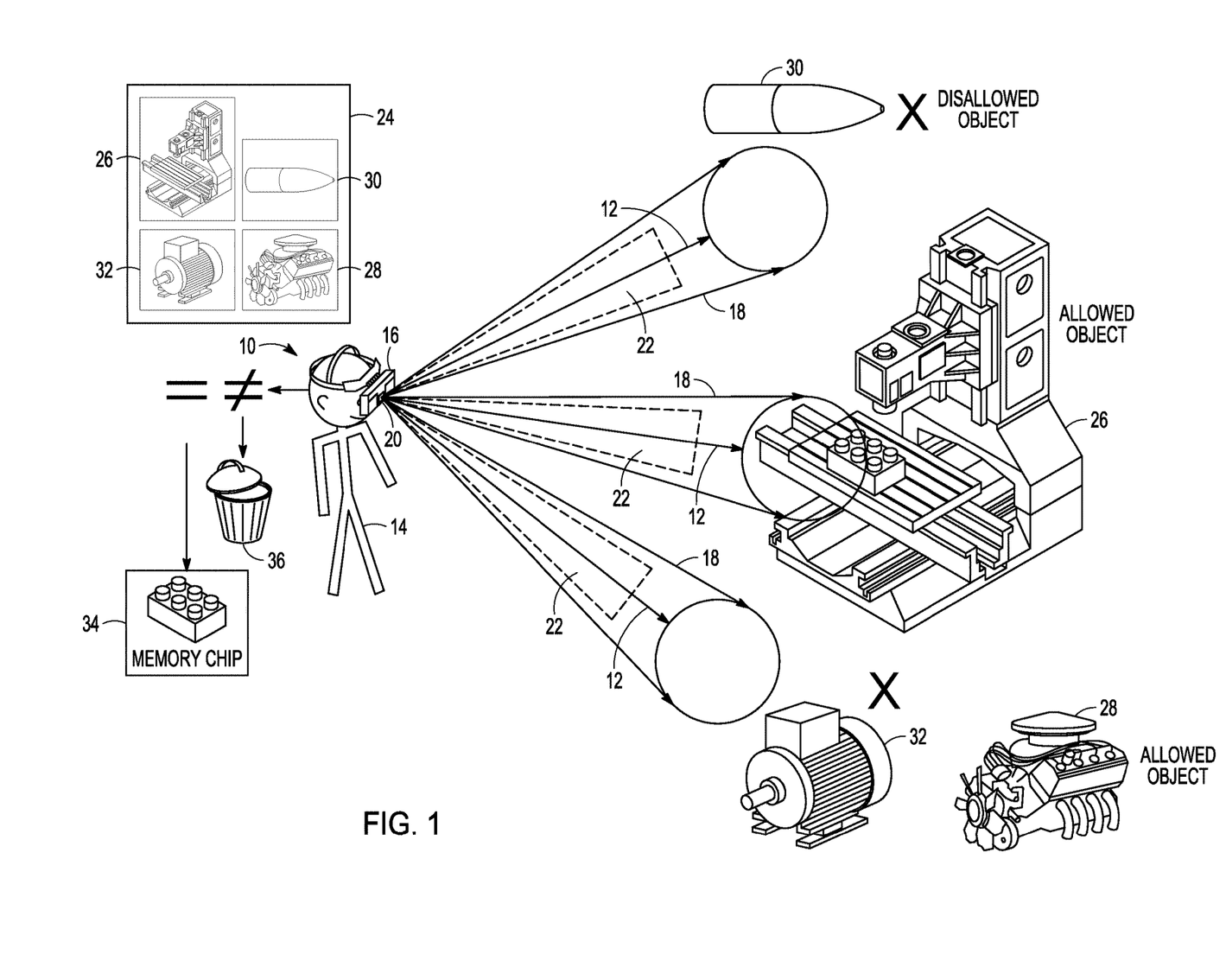
FIG. 1 is an illustration of a system in which time-delayed storage of the camera images that form the video signal provides for enforcement of data capture and transmission compliance of real and near real time video.

Referring now to FIG. 1, in an embodiment a video capture, display and transmission device 10 such as a pair of video goggles or a hand-held unit (e.g. a tablet or cell phone) has a pointing direction 12 that is slaved to technician motion (e.g., where a field technician 14 is looking or pointing the unit). Device 10 includes a sensor 16 (e.g. a 3D camera, LIDAR, Sonar) configured to capture a sensed signal in a sensor FOV 18 about pointing direction 12 to recognize and locate objects and a video camera 20 (e.g. a 2D or 3D CMOS, CCD or SWIR camera) configured to capture light within a camera FOV 22 about pointing direction 12 and within the sensor FOV 18 to form a video signal.

In this example, field technician 16 may be moving around inside a manufacturing facility to confirm the existence and location of certain objects, repair or maintain certain objects or to use certain objects. These objects may be considered to be "allowed" objects. The technician may even be prompted or cued to maintain the pointing direction 12 on a specified object to perform a certain task (e.g., verification, repair, use). The field technician 16 can capture, display and transmit "allowed" objects. The field technician 16 cannot capture in memory, much less display or transmit, "disallowed" objects.

What constitutes allowed or disallowed objects may depend on the application, the type of objects in the local scene, the permissions of the field technician, supervisor and any remote staff, and any specific restrictions placed on excluded data and transmission compliance. This information may be stored in the device. The device processes the sensed signal to detect and locate objects and determine whether they are allowed or disallowed objects. The efficiency and accuracy of the object recognition process can be improved by augmenting it with a 3D ground truth map 24 that was formed using sensor 16 in which specific objects 26 and 28 were indicated as allowed and specific objects 30 and 32 were indicated as disallowed. The objects may be represented in the ground truth map as real sensor data or as 2D or 3D computer-generated models. Background in the local scene and ground truth map may default to either allowed or disallowed. Objects that move into the scene that are not in the ground truth map are suitably disallowed until identified and marked as allowed. Similarly objects that are unrecognized are suitably disallowed until identified and marked as allowed. Instead of just being based on their content, objects may be defined and disallowed based on other attributes. For example, any object that is identified as having a distance from the video camera that is either too close (<min distance) or too far (>max distance) may be designated as disallowed. The rate of motion (e.g., velocity and acceleration) of the video camera may be defined as an object and disallowed if the rate of motion exceeds a maximum value. The device compares recognized objects to the ground truth map to verify whether it's the same object, allowed or disallowed and the location, which greatly improves the accuracy and confidence of the object recognition.

To prevent the capture and transmission of excluded data, a short time-delay between capture of the sensed signal by the sensor and capture of the video signal by the video camera is exploited to recognize disallowed objects and control the video camera to interrupt and stop images from being transferred into a memory chip 34 where the video signal is formed. The time-delay can also be used to enforce an alignment condition of the video camera to an allowed object. The time-delay can be implemented in real or near real time or slower if the application does not demand such performance with a delay line or temporary memory chip positioned between the video camera's ROIC and memory chip 34. For example, the slowest acceptable video frame rate for most users is approximately 24 frames/sec (fps), or approximately 42 milliseconds (ms).

For example, if pointing direction 12 satisfies an alignment condition (e.g., pointing direction within a few degrees of a preferred line-of-sight (LOS)) to allowed object 26 to perform some task and the sensor does not recognize and locate any disallowed objects 30 or 32, the time-delayed images captured by the video camera are transferred to memory chip 34 where they are formed into the video signal that may be displayed to the field technician or transmitted to a remote location (e.g. storage or display to other remote users). If either condition is violated, the video camera is controlled to interrupt and stop images from being transferred into a memory chip 34; instead they are shunted or dumped to "trash" 36. The video camera may be controlled by interrupting its power (i.e. turning the camera off), deactivating the ROIC, dumping the images from the delay line or circuit or temporary memory chip or, in the case of disallowed objects, editing the images to delete or obscure the disallowed objects before they are transferred to the memory chip. Prior to or along with controlling the video camera, a cue (e.g. audio, video or mechanical vibration) may be directed to prompt the field technician to look at the allowed object or away from the disallowed object. If the cue is successful, they video camera may not have to dump (or edit) any of the images or the length of any such interruption may be minimized. The object recognition and decision process can be implemented such that the time-delay is very short and although delayed the video signal is effectively real or near real time.

The same method can be applied to a remotely user-controlled robotic arm that points the video camera or a fully autonomous robot that uses a video camera as part of its vision system. In the case of the robotic arm, "time-delay" can ensure that protected data is not captured and transmitted to remote site, where the user is located or elsewhere. In the case of a fully autonomous robot, "time-delay" can ensure that protected data is not captured and used by the robot or transmitted elsewhere.

The method can be applied to applications and local scenes in which only allowed objects are present or only disallowed objects are present.

Referring now to FIGS. 2, 3A-3B and 4, in an embodiment a video capture and display device 100 includes a video camera 102, a sensor 104 and an interrupt processor 106 to control the video camera to prevent disallowed objects from being captured in the video signal and to enforce an alignment condition to allowed objects. Device 100 is coupled to a "platform" 107 such as a user, robotic arm, robot etc. that controls the pointing direction of the device.

Figure 2:
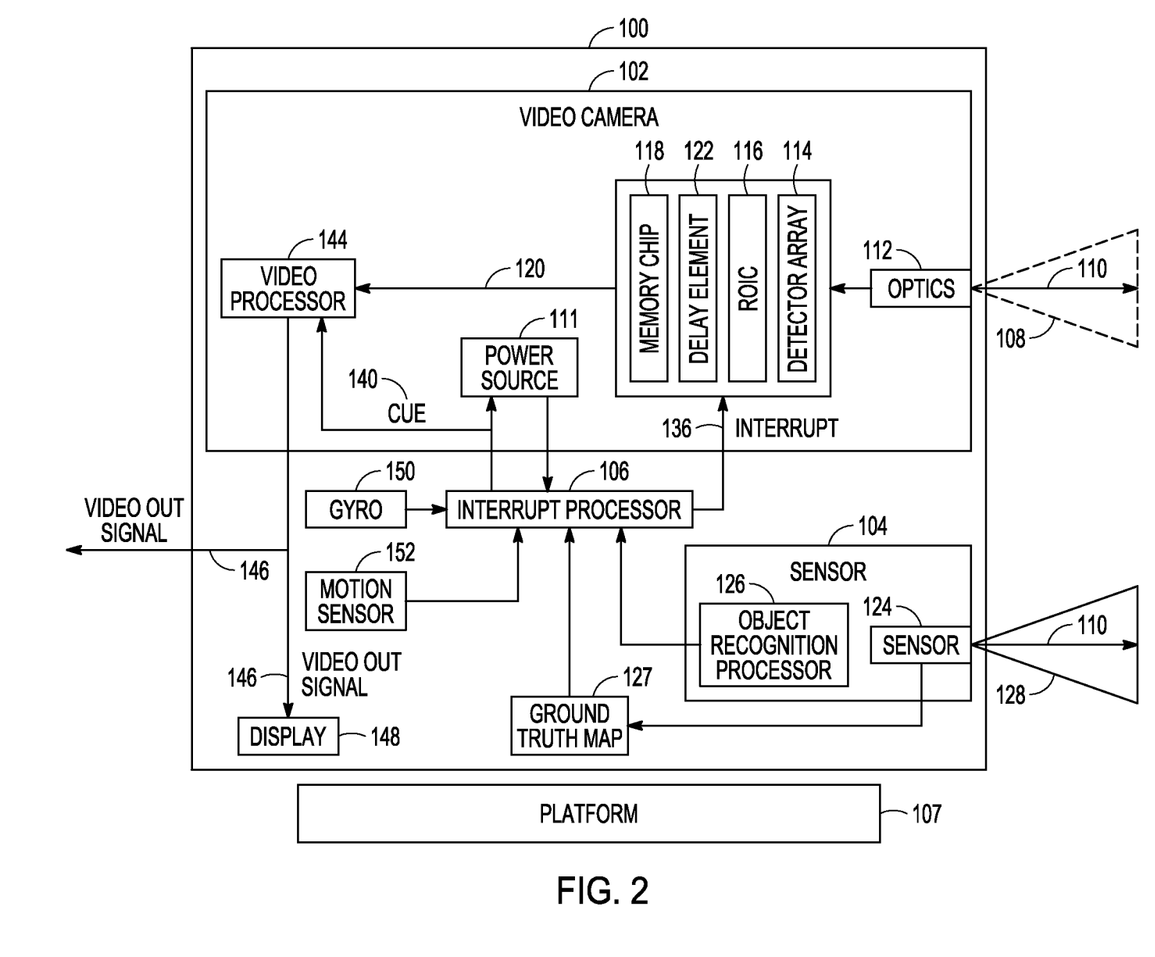
FIG. 2 is a block diagram of an embodiment of a video capture, display and transmission device to enforce data capture and transmission compliance of real and near real time video.
Figure 3A:
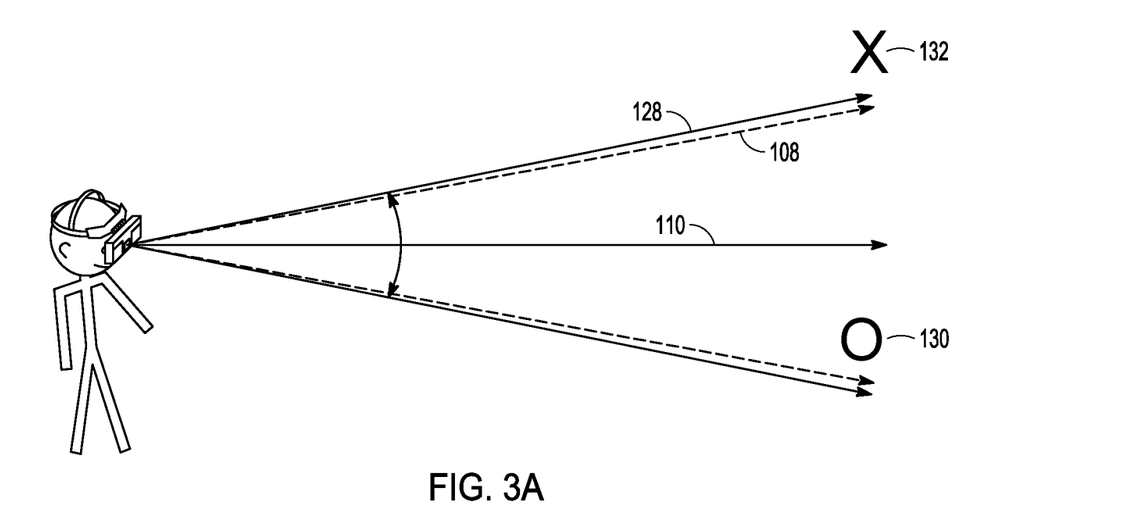
FIGS. 3A and 3B are illustrations of an embodiment in which the video camera and sensor FOV are equivalent relying only on the time-delayed storage of camera images with respect to the sensed signal to enforce data capture and transmission compliance.
Figure 3B:
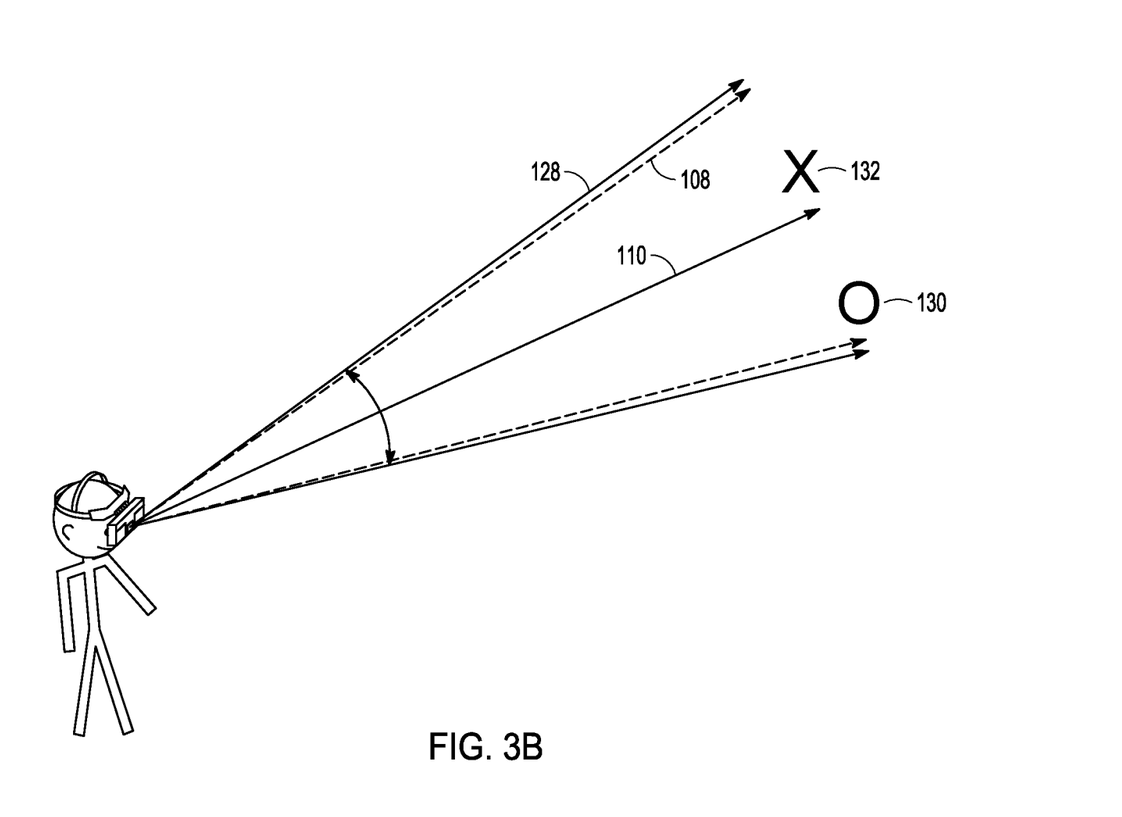

Video camera 102 captures light within a camera field-of-view (CFOV) 108 in a pointing direction 110 in the local scene. The video camera includes a power source 111, optics 112 to collect light within the CFOV, a detector array 114 to sense and integrate light to form an image converting photons to electrons, a read out integrated circuit (ROIC) 116, which includes an amplifier and an A/D converter, to read out a sequence of images at a frame rate, a memory chip 118 to store the sequence of images to form a video signal 120, and a delay element 122 to delay the transfer of images to the memory chip 118 by a time-delay. Delay element 122 may be a delay line (circuit) that simply delays transfer of the images or a temporary memory chip that holds the images for the time-delay and then transfers the images to the memory chip. A temporary memory chip would be physically isolated from other components such that the images could not be displayed or transmitted. The contents of the temporary memory chip would be discarded after they are transferred to the memory chip.

Sensor 104 includes a 3D sensor 124 such as a 3D camera, LIDAR or sonar and an object recognition processor 126 to capture a sensed signal within a sensor FOV (SFOV) 128 along the pointing direction 110 that spans the entire CFOV 108 and process the sensed signal to recognize and locate allowed and disallowed objects 130 and 132, respectively, within the SFOV. As previously mentioned, object recognition processor 126 may verify detected allowed or disallowed objects against a 3D ground truth map 127. Sensor 104 is isolated from video processor 144 or any other circuitry or network downstream of video capture and display device 100 to which the video camera may be connected to distribute the video signal.

If, prior to the expiration of the time-delay imposed by delay element 122, a disallowed objected is recognized in one or more frames 134 from the sensor, the interrupt processor 106 issues an interrupt 136 to video camera 102 to prevent storage of images including the disallowed object in the memory chip and its inclusion in subsequent frames 138 in the video signal. This prevents disallowed objects from entering the video signal and reaching other circuitry, processing or a network to which the video camera is connected downstream from the memory chip. Interrupt 136 can cut-off power shutting off the video camera, deactivate the ROIC (e.g. disable the amplifier or A/D converter), serve to edit the images to remove or obscure pixels corresponding to the disallowed object or control the platform 107 to change the pointing direction of the video camera. Interrupt processor 106 may also issue a cue 140 to prompt the "platform" 107 to change the pointing direction away from the disallowed object. If the platform is a user, the cue may be handled by the video processor to relay a visual or audio cue to the user. If successful, interrupt 136 may be removed and the video camera allowed to function normally. If unsuccessful, the interrupt 136 may shutdown the video camera until the issue is resolved.

Figure 4:
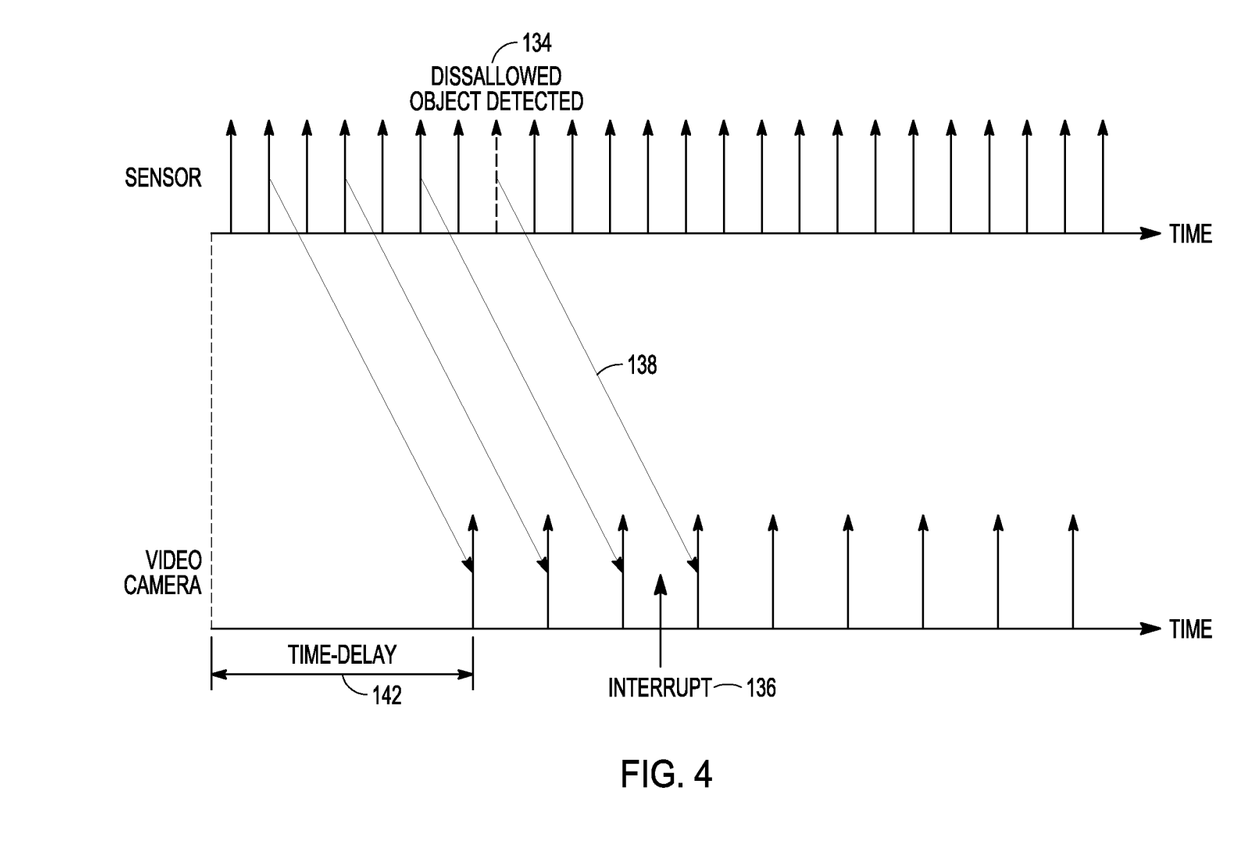
FIG. 4 is a timing diagram illustrating the time-delay of the captured video signal with respective to the sensor signal and an interrupt to prevent capture of a disallowed object in the video signal.

As shown in FIG. 4, the time-delay 142 can be one or more video frames (N). As long as the interrupt is issued less than N video frames after the disallowed object is detected by the sensor at frame 134, the time-delayed images that contain the disallowed object will be interrupted and not transferred to the memory chip. In an alternate embodiment, the delay element is omitted. The time-delay is implemented by using a sensor whose frame rate exceeds that of the video camera. If an object is recognized in a frame output by the sensor, the ROIC is deactivated before it reads out the next image.

A video processor 144 processes video signal 120 to form video out signals 146 for a display 148 or transmission. If no disallowed objects are detected the video out signals 146 will be normal video signals. If an interrupt was issued, the video out signals 146 may receive no video signal if power was interrupted, may receive a blank or noisy video signal if the ROIC is deactivated or may receive a video signal in which the pixels corresponding to the disallowed objected are removed or obscured. In the later case, it is critical to note that the images are edited in real-time between the ROIC and the memory chip, not after storage in the memory chip.

Sensor 104 can also be used to recognize and locate allowed objects 130, and to verify them against ground truth map 127. Interrupt processor 106 determines whether the camera's pointing direction 110 satisfies an alignment condition to the allowed object 130. For example, is the pointing direction 110 within +/−2 degrees of an intended line-of-sight to the allowed object? This determination can be achieved by comparing the current sensor FOV 128 against the ground truth map, for example. Alternately, a gyroscope 150 can be used to track the video camera's 6 degree-of-freedom (6DOF) pose e.g. position in x,y,z and orientation in yaw, pitch, roll (rotations about x,y,z axes). The current pose can be compared to a calculated pose to the allowed object to determine whether alignment condition is satisfied. If the pointing direction fails to satisfy the alignment condition, interrupt processor 106 may generate a cue 140 to change the video camera pointing direction to enforce the alignment condition. If the cue fails to enforce the alignment condition, the interrupt processor 106 issues an interrupt 136 to deactivate the video camera. Loss of the alignment condition does not necessarily mean that the camera is going to capture a disallowed object. However, if the video camera wanders off of the allowed object and the cue fails to correct the problem, turning off the video camera, at least temporarily, is effective to train the platform to maintain the proper alignment to the allowed object to perform the task at hand. The length of time the video camera is turned off can vary in order to more effectively train the local or remote user or robot.

Figure 5A:
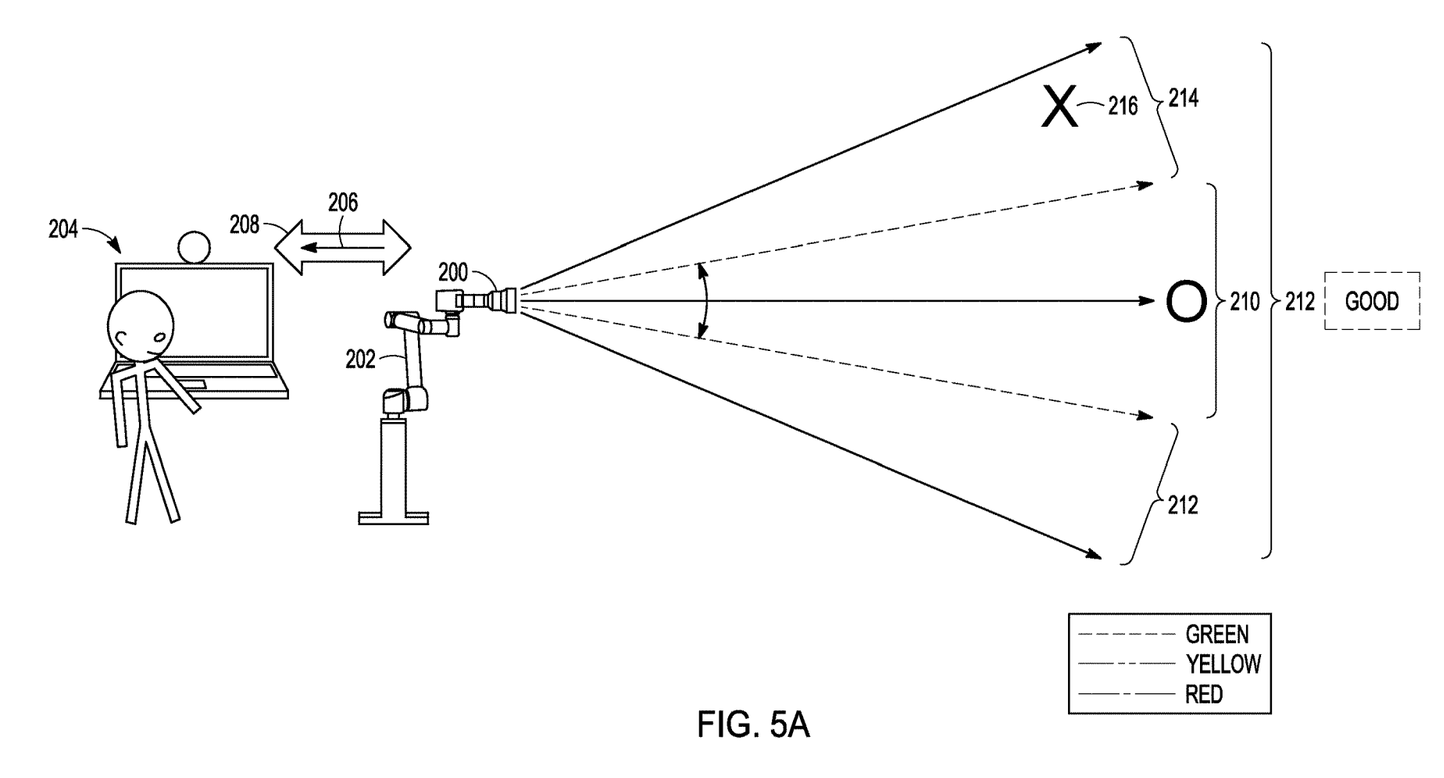
FIGS. 5A and 5B are illustrations of an embodiment in which the sensor FOV provides a buffer region around the video camera FOV relying on both the time-delayed storage of camera images with respect to the sensed signal and the buffer region to both cue and enforce data capture and transmission compliance.
Figure 5B:
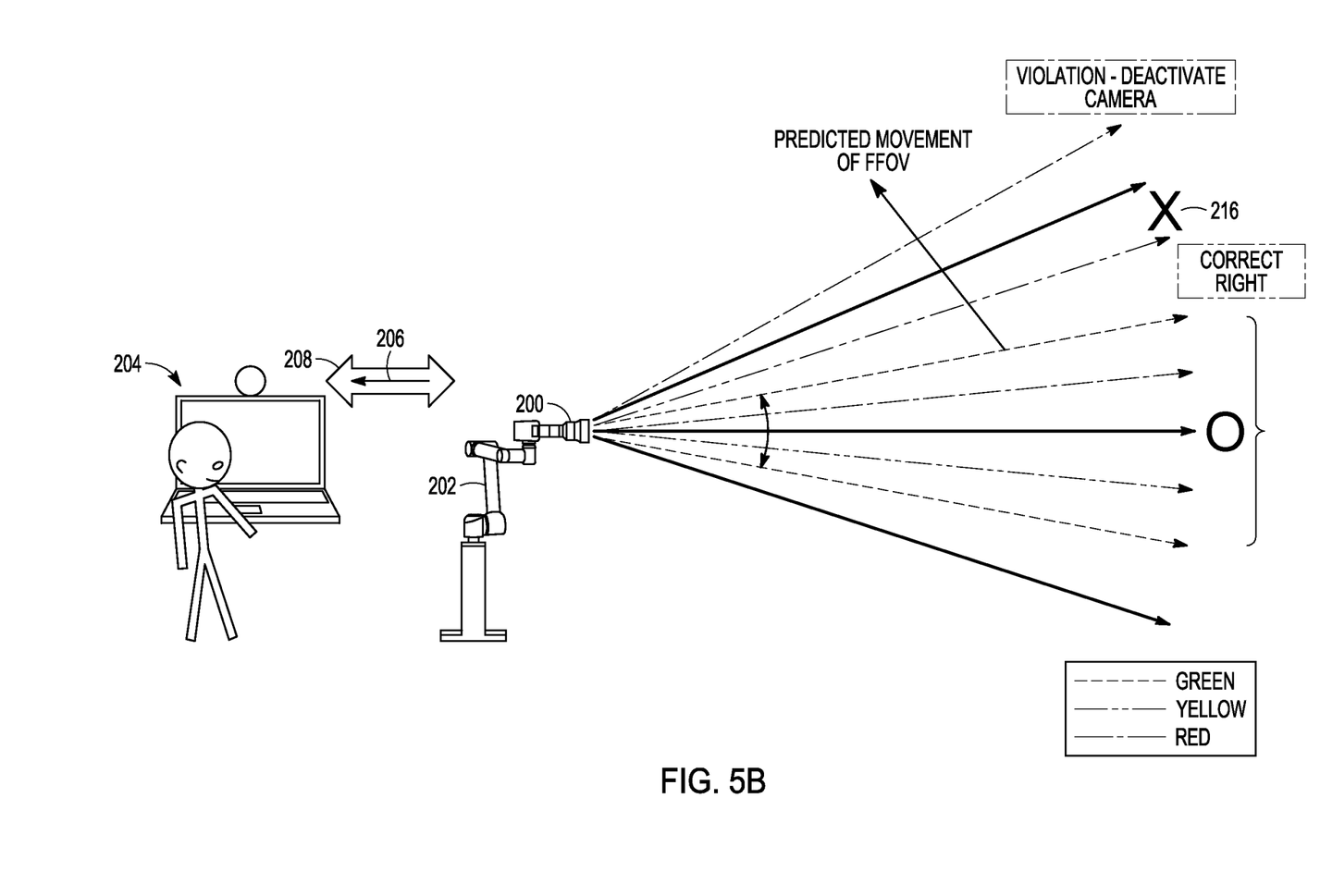

Referring now to FIGS. 5A and 5B, in an embodiment a video capture and transmission device 200 is mounted on a robotic arm 202 that is controlled by a remote user 204. A video signal 206 captured by device 200 is transmitted via a communication link 208 to remote user 204 who sends instructions to robotic arm 202 via communication link 208 to control the location and orientation or "pose" of device 200. Device 200 includes a video camera that captures light within a camera FOV 210 in a pointing direction dictated by the orientation of the device. A sensor captures light within a sensor FOV 212 along the same pointing direction. In this embodiment, the sensor FOV 212 is larger than the camera FOV 210 creating a buffer zone 214 on either side of camera FOV 210 in which a disallowed object is detected as the device pose changes prior to entering the camera FOV 210. This effectively creates a predictive or non-causal time-delay (in addition to the existing time-delay) that allows the interrupt processor to act before a disallowed object enters the camera FOV. If a disallowed object 216 is recognized in buffer zone 214, the interrupt processor has time to generate a cue to change the video camera pointing direction to prevent the disallowed object from ever enter the camera FOV 210. If the cue is successful no further control of the video camera is required as the potential disallowed object has been avoided. If the cue fails and the disallowed object enters the camera FOV 210, the time-delay is sufficient to allow the interrupt processor to issue the interrupt to the video camera to prevent the images that contain the disallowed object from reaching the memory chip. Given the additional time provided by the prediction, the options for the interrupt include those mentioned previously for the time-delay plus controlling the robotic arm to turn away from the disallowed object, deactivating the top electrochemical layer on the detector array so that photons are not converted to electrons, using the optics to narrow the camera FOV or selectively blur areas containing the disallowed objects (e.g. change the f/# to focus on near objects and blur far objects), changing lighting of the scene to cause blinding of the sensor, or turning off pixels in the detector corresponding to the disallowed object. The combination of time-delay with the buffer zone provides a more robust solution in both the ability to recognize and prevent disallowed object detection and to enforce an alignment condition to an allowed object and options to control the video camera that either approach individually.

In an AR environment the pointing direction of the video camera is slaved to field technician motion (e.g., technician's head in the case of goggles or hands in the case of a hand-held unit). A video signal is captured within a FOV of an object in a local scene at arm's length from the technician. The technician receives hand gestures for manipulation of the object from an expert at a remote location, which are registered and overlaid on the video signal to create an augmented reality to instruction the user in manipulation of the object. In different implementations, the hand gestures are provided when an expert views and responds to the video signal captured and transmitted to the remote field location by the technician's video camera in real-time, when an expert interacts with a replica of the object in real-time or when an expert generates "canned" instructions offline by either responding to a video or interacting with a replica of the object.

The concern is that the technician may turn away from the object of interest, intentionally or unintentionally, and capture video of another portion of the scene or object that should not be captured or transmitted. The present invention provides a system and method for automatically and under technician/customer/master ("user") control controlling the video camera in such a constrained AR environment to exclude portions of a scene for data capture and transmission compliance without interfering with the AR overlays that instruct the technician in manipulation of the object.

Figure 6:
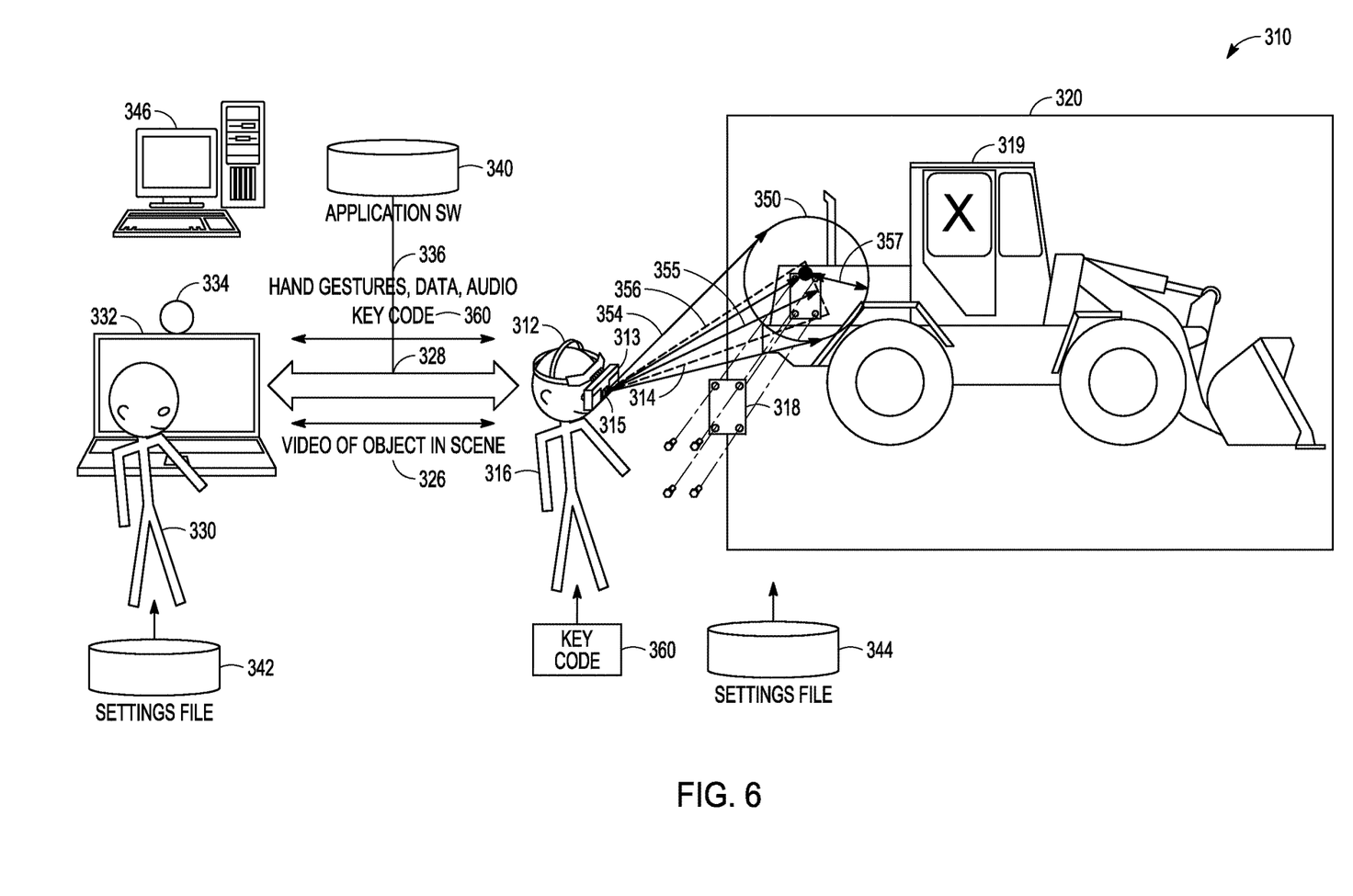
FIGS. 6 and 7 are illustrations of an embodiment of an Augmented Reality (AR) system in which time-delayed storage of the camera images that form the video signal is used to enforce an alignment condition to an allowed objected and to prevent capture of disallowed objects.
Figure 7:
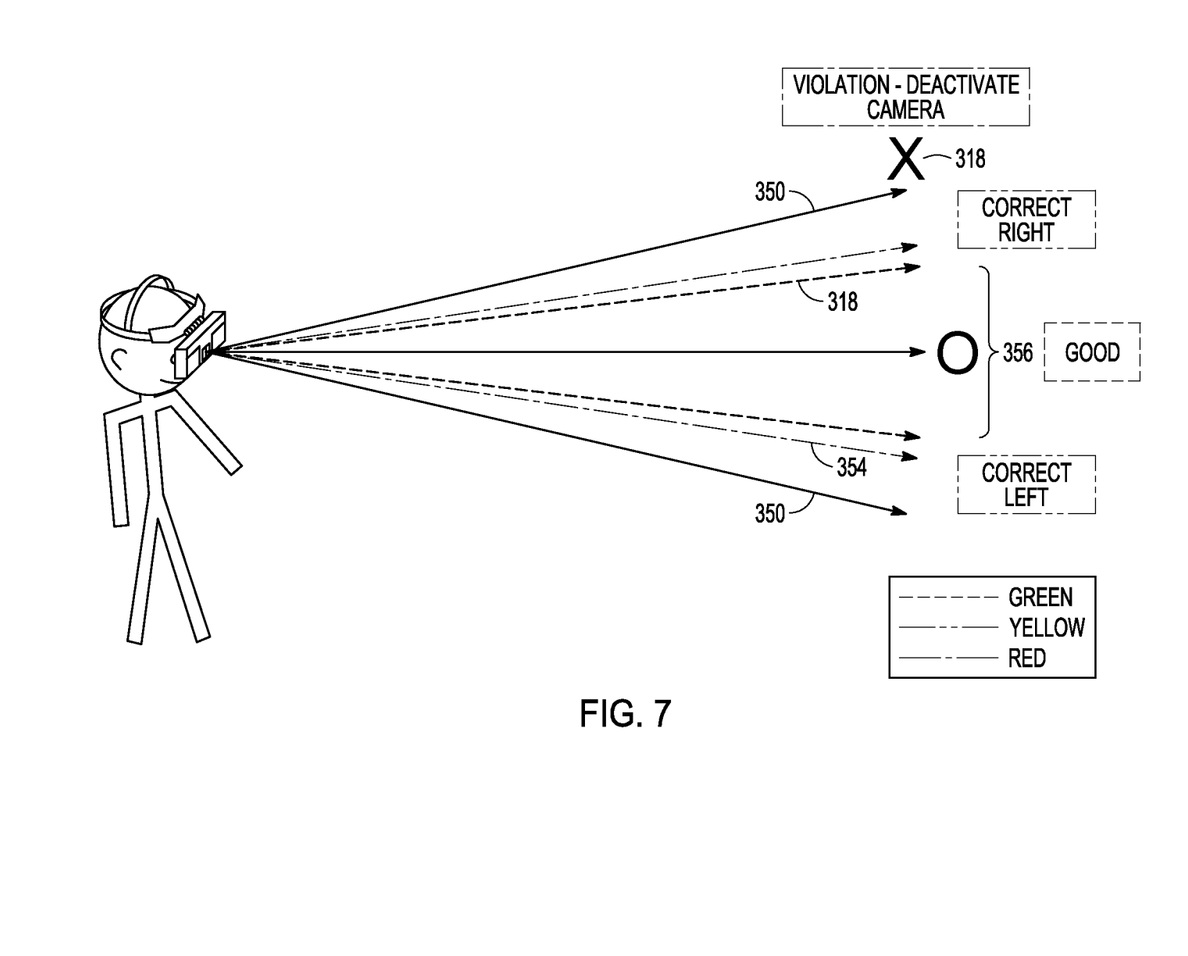

With reference to FIGS. 6 and 7, an embodiment of an AR system 310 includes a video capture, display and transmission device 312 such as a pair of video goggles or a hand-held unit (e.g. a tablet or cell phone) whose pointing direction 314 is slaved to technician motion (e.g., where a field technician 316 is looking or pointing the unit). Field technician 316 manipulates an object 318 in a local scene 320 to, for example, perform maintenance on the object or receive instructions on how to operate the object. In this example, object 318 is an access panel and the local scene includes a tractor. The access panel is an "allowed" object. For purposes of illustration, the cabin 319 is a "disallowed" object.

Device 312 includes an object recognition sensor 313 (e.g. a 3D camera, LIDAR or sonar) that captures a sensed signal and a video camera 315 that captures imagery of object 318 in local field scene 320 with a short time-delay and transmits a video signal 326 over a communications link 328 or network to a remote site, possibly in a different country. Sensor 313 and the sensed signal are isolated from communications link 328 or the network. Video signal 326 is presented to an expert 330 on a computer workstation 332, which is provided with a device 334 to capture the expert's hand gestures. Expert 330 manipulates the object in the video with his/her hands (or via a tool) to perform the task. Device 334 captures the hand gestures, which are converted to animated hand gestures 336 and transmitted back over communications link 328 to user 316 where they are registered to and overlaid on the display. Expert 330 may provide instructions in the form of audio, text or other media in addition to or instead of the hand gestures to support the AR environment. The AR environment itself is implemented with application software 340 and settings files 342 and 344 on the remote and local computer systems 332 and 312 and a server 346.

In accordance with the invention, the AR system or method determines whether the pointing direction 314 of the local video capture and display device 312 satisfies an alignment condition 350 to allowed object 318. Alignment condition 350 relates the camera pointing direction 314 to a line-of-sight (LOS) 355 to the allowed object. The two must remain with a specified misalignment 357 given as an angle or distance to the allowed object. The misalignment 357 may be fixed e.g. plus or minus 5 degrees, set by the user.

One or more technician/customer, master or expert key codes 360 are used to identify the technician/master/expert, define pairing of the allowed object and specify tolerances that define the alignment condition 350. A key code allows the field technician/customer/master or an expert to control the video camera to protect the field technician from capturing and/or transmitting data in the scene that would violate customer or country policies or legal requirements. The key code may allow the holder of the code to specify via, for example thru a GUI, allowed or disallowed objects or may pre-load those selections for a given local scene or task. To establish the alignment condition, a user might specify a 24" distance, which creates a circle with a 24" radius about the LOS to the allowed object. Alternately, the user might specify a plus/minus 5 degrees of misalignment for the pointing direction, which for the nominal arm's length working distance might create, for example, a circle with a 12" radius. Instead of or in addition to specifying a distance or angle, the user might specify and place additional markers (disallowed objects) in the scene about the allowed object that define the outer boundary or tolerance of the alignment condition. Activation of the video capture and display device 312 would require successful pairing with at least the identified allowed object. Another expert controlled key code may be provided at the remote location to the field technician to ensure that no non-complying data is transmitted and received at the remote location. This key code is enforced at the field technician's AR system. In addition to distances, the key code may also prepopulate a known set of allowed or disallowed shapes.

Object recognition sensor 313 captures a sensed signal within a sensor FOV 354 along pointing direction 314 that includes and, in this example, exceeds a camera FOV 356. Video camera 315 captures light within the camera FOV 356 while delaying the storage of images in the memory chip by a time-delay with respect to the sensed signal. The object recognition sensor processes the sensed signal to recognize and locate allowed 318 or disallowed 319 objects within the sensor FOV 354. An interrupt processor determines, using the detected sensed signal or gyroscope measurements for example, whether the pointing direction 314 satisfies the alignment condition 350 to allowed object 318 and whether the video camera's FOV 356 does or shortly will include the disallowed object 319.

As regards satisfaction of the alignment condition to the allowed object 318, as long as the technician looks in the direction of the allowed object 318 the allowed object is captured in the sensor FOV 354 and the alignment condition is satisfied (green "Good") thereby enabling the camera to capture imagery in the camera FOV 356. As the technician's eyes (camera) begin to wander, the allowed object gets close to the edge of alignment condition 350 (yellow "Correct Left" or "Correct Right") thereby causing a cue (audio, video, vibration) to be issued as a reminder to the technician to maintain his or her focus on the allowed object 318 and the task at hand. The camera remains enabled and video is captured for transmission and display. If the technician's LOS wanders too far, the sensor FOV loses pairing with allowed object 318 thereby violating the alignment condition 350 and causing the video camera to be disabled and a cue (red, "Deactivate Camera") to be issued. The length of time the video camera is disabled can be controlled to "train" the technician to maintain his or her focus on the allowed object.

As regards preventing the capture of disallowed object 319 in the video signal, if disallowed object 319 is captured in the sensor FOV 354 an interrupt is issued to control the video camera such that any camera images containing disallowed object 319 are not transferred to the memory chip and thus not included in the video signal including interrupting power to the video camera, disabling the ROIC, dumping or editing the time-delayed images before they are transferred to the memory chip. A cue e.g., red "Deactivate Camera" or similar can be issued to the technician to notify the technician of the violation as to the disallowed object and to prompt the technician to change his or her LOS.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of preventing capture and transmission of excluded data in a local scene from a video signal, said method comprising:
   using a video camera to capture light within a camera field-of-view (CFOV) in a pointing direction in the local scene, said video camera including a detector array to sense and integrate light to form an image, a read out integrated circuit (ROIC) to read out a sequence of images at a frame rate and a memory chip to store the sequence of images to form the video signal; and
   prior to forming the video signal,
      using a sensor and an object recognition processor to capture a sensed signal within a sensor FOV (SFOV) along the pointing direction that spans the entire CFOV and process the sensed signal to recognize and locate disallowed objects within the SFOV;
      using the video camera to capture light within the CFOV while delaying the storage of images in the memory chip by a time-delay with respect to the sensed signal; and
      in response to recognition of the disallowed object and prior to expiration of the time-delay, controlling the video camera to prevent storage of images including the disallowed object in the memory chip and its inclusion in the video signal.

2. The method of claim 1, wherein the sensor is read out at a higher frame rate than the ROIC frame rate, wherein in response to the recognition of a disallowed object, disabling the ROIC prior to reading out the next frame of the image including the disallowed object.

3. The method of claim 1, wherein the video camera comprises a delay element between the ROIC and memory chip, wherein in response to the recognition of a disallowed object, controlling the delay element to dump the time-delayed image including the disallowed object before it reaches the memory chip.

4. The method of claim 3, wherein the delay element is a delay line that delays transfers of the images to the memory chip by the time-delay or a temporary memory chip that holds the images for the time-delay before transferring them to the memory chip.

5. The method of claim 1, wherein the video camera comprises a delay element between the ROIC and memory chip, wherein in response to the recognition of a disallowed object, editing one or more images to obscure or remove the disallowed object before the one or more images are stored in the memory chip.

6. The method of claim 1, further comprising:
using a sensor to generate a 3D ground truth map of the local scene;
identifying one or more objects in the ground truth map as disallowed; and
verifying any recognized disallowed objects to the ground truth map.

7. The method of claim 6, wherein the sensor is one of a 3D video camera, LIDAR or Sonar.

8. The method of claim 6, wherein the ground truth map includes a computer generated 2D or 3D model of at least one of the disallowed objects.

9. The method of claim 1, wherein if a recognized object is either less than a minimum distance to the video camera or greater than a maximum distance to the video camera it is recognized as a disallowed object.

10. The method of claim 1, further comprising:
measuring a rate of motion of an object entering the local scene or of the video camera relative to the local scene; and
if the measured rate of motion exceeds a maximum value, deactivating the video camera.

11. The method of claim 1, wherein the time-delay is less than 42 ms.

12. The method of claim 1, wherein the sensor FOV is larger than the camera FOV to create a buffer zone in which a disallowed object is detected prior to entering the camera FOV.

13. The method of claim 12, further comprising:
if a disallowed object is recognized in the buffer zone, generating a cue to change the video camera pointing direction to prevent the disallowed object from entering the camera FOV.

14. The method of claim 1, further comprising:
using the sensor and object recognition processor to recognize and locate allowed objects;
determining whether the camera's pointing direction satisfies an alignment condition to one of the allowed objects;
if the pointing direction fails to satisfy the alignment condition, generating a cue to change the video camera pointing direction to enforce the alignment condition; and if the cue fails to enforce the alignment condition, deactivating the video camera.

15. The method of claim 14, further comprising:
using a sensor selected from a 3D video camera, Lidar or Sonar to generate a 3D ground truth map of the local scene;
providing a computer generated 2D or 3D model of the allowed object for which the alignment condition is enforced;
identifying one or more objects in the ground truth map as disallowed; and
verifying any recognized disallowed objects to the ground truth map.

16. The method of claim 14, further comprising:
slaving the pointing direction of the video camera to user motion;
wherein the cue prompts the user to change the user's pointing direction to enforce the alignment condition.

17. The method of claim 16, wherein the local scene is an augmented reality (AR) environment, further comprising:
receiving from a remote location instructions in the form of audio, text, or video media related to the allowed object; and
registering the instructions to the video signal and displaying an augmented reality to the user to instruct the user.

18. The method of claim 1, further comprising:
distributing the video signal to a network; and
isolating the sensor from the network.

19. A method of preventing capture and transmission of excluded data in a local scene from a video signal, said method comprising:
using a video camera to capture light within a camera field-of-view (CFOV) in a pointing direction in the local scene, said video camera including a detector array to sense and integrate light to form an image, a read out integrated circuit (ROIC) to read out a sequence of images at a frame rate, a memory chip to store the sequence of images to form the video signal, and a delay element positioned between the ROIC and the memory chip to delay storage of the image by a time-delay;
using a sensor and an object recognition processor to capture a sensed signal within a sensor FOV (SFOV) along the pointing direction that spans the entire CFOV and process the sensed signal to recognize and locate disallowed objects within the SFOV; and
in response to recognition of the disallowed object and prior to expiration of the time-delay, controlling the delay element to prevent storage of images including disallowed objects in the memory chip and their inclusion in the video signal.

20. A method of preventing capture and transmission of excluded data in a local scene from a video signal, said method comprising:
using a video camera to capture light within a camera field-of-view (CFOV) in a pointing direction in the local scene, said video camera including a detector array to sense and integrate light to form an image, a read out integrated circuit (ROIC) to read out a sequence of images at a frame rate and a memory chip to store the sequence of images to form the video signal; and
prior to forming the video signal, using a sensor and an object recognition processor to capture a sensed signal within a sensor FOV (SFOV) along the pointing direction that spans the entire CFOV;

using the video camera to capture light within the CFOV while delaying the storage of images in the memory chip by a time-delay with respect to the sensed signal;

processing the sensed signal to recognize and locate allowed and disallowed objects within the SFOV;

determining whether the video camera pointing direction satisfies an alignment condition to an allowed object;

determining whether the video camera's CFOV includes a disallowed object;

if either the pointing direction fails to satisfy the alignment condition or the disallowed object is recognized and prior to expiration of the time-delay, controlling the video camera to prevent storage of images in the memory chip and their inclusion in the video signal.

* * * * *

UNITED STATES PATENT AND TRADEMARK OFFICE
CERTIFICATE OF CORRECTION

PATENT NO. : 11,792,499 B2
APPLICATION NO. : 17/507073
DATED : October 17, 2023
INVENTOR(S) : Mayorga et al.

It is certified that error appears in the above-identified patent and that said Letters Patent is hereby corrected as shown below:

On the Title Page

In Column 2, under "Other Publications", Line 1, delete "Appication" and insert --Application-- therefor On page 2, in Column 2, under "Other Publications", Line 1, delete "Respoonse" and insert --Response-- therefor On page 2, in Column 2, under "Other Publications", Line 31, delete "Capturie of" and insert --Capture and-- therefor On page 2, in Column 2, under "Other Publications", Line 35, delete "Capturie" and insert --Capture-- therefor On page 3, in Column 2, under "Other Publications", Line 32, delete "2023"." and insert --2023",-- therefor In the Specification In Column 6, Line 31, delete "16" and insert --14-- therefor In Column 6, Line 38, delete "16" and insert --14-- therefor In Column 6, Line 40, delete "16" and insert --14-- therefor Signed and Sealed this
Third Day of December, 2024

Katherine Kelly Vidal
*Director of the United States Patent and Trademark Office*